June 21, 1960 R. P. SAAR 2,941,779
ROTARY VALVE
Filed Jan. 7, 1957
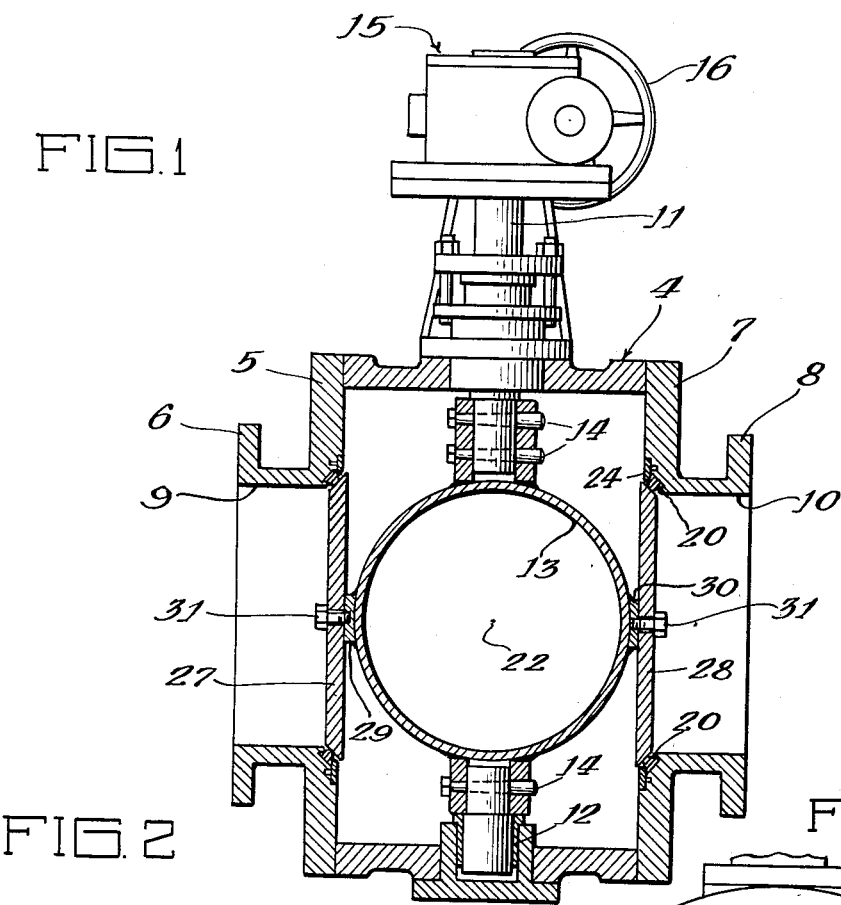
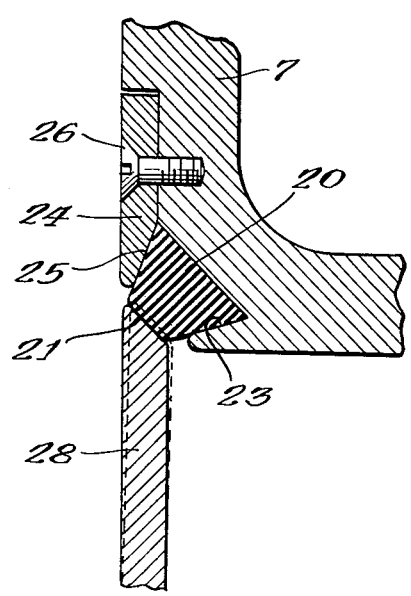
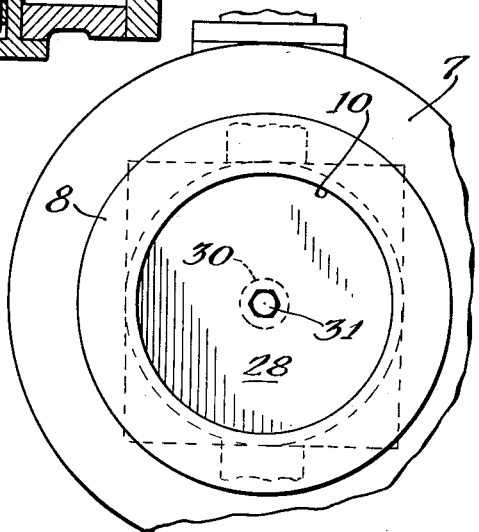
Inventor:
Robert P. Saar
By Schrader, Hofgren,
Brady & Werner
Attorneys United States Patent Office 2,941,779
Patented June 21, 1960

2,941,779
ROTARY VALVE
Robert P. Saar, Chicago, Ill., assignor to Henry Pratt Company, a corporation of Illinois
Filed Jan. 7, 1957, Ser. No. 632,827
3 Claims. (Cl. 251—175)

This invention relates to a rotary valve and, more particularly, to such a valve including novel means for insuring tight closure over a long service life.

The particular valve type with which the present invention is involved has at various times been designated by different names. Their structures are generally common, whether called ball valves, spherical valves, rotary valves, or by a similar name. They involve a housing having spaced inlet and outlet openings with a rotor within the housing for opening and closing the valve. The rotor generally includes a cylindrical pipe section or equivalent thereof which can be aligned with the inlet and outlet to provide a completely unobstructed open valve. Discs carried on the rotor may be turned into contact with valve seats around the inlet and outlet to seal off the passage through the valve housing.

The difficulty with such valves in the past has been the excessive wear occasioned by repeated opening and closing of the valve. Mating surfaces on the discs and valve seats have been machined spherical as close as possible, but the metal-to-metal contact under heavy load has scraped the mating parts so as to damage them. After some use, such valves have generally leaked badly and no economical means of correcting the situation has been known.

It is the primary object of this invention to provide a new and improved rotary valve closing structure.

Another object is to provide a rotary valve with a resilient seat so positioned that it will lightly contact closure discs brought into cooperative relation with the seats.

Another object is to provide a rotary valve having a resilient seat and resiliently flexible closure discs for cooperation with the seats.

A further object is to provide a rotary valve with a closure mechanism which operates to close more tightly with higher pressure.

Other objects, features, and advantages of the present invention will be apparent from the following description of a preferred embodiment illustrated in the accompanying drawings, in which:

Figure 1 is a vertical elevational view partially in section through a rotary valve in closed position and embodying the invention;

Figure 2 is a fragmentary enlarged sectional view showing the cooperating disc and valve seat; and Figure 3 is a fragmentary plan view looking toward one of the closure discs.

The valve with which the present invention is used has a housing 4, which is considerably larger than the pipe line with which the valve is to be used. A ring member 5 is bolted to the housing proper and is provided with a flange 6 for connection in the pipe line. A similar ring 7 is bolted to the housing on the opposite side and has a similar flange 8 for the same purpose. The inlet 9 is formed in the ring 5 and will be of the same size as the pipe line with which the valve is to be used. An inlet 10 is similarly formed and the inlet and outlet may be reversed if desired.

The valve is provided with a valve stem 11 extending diametrically through the housing 4 so that it is provided with a lower bearing 12 and an upper bearing 13 supporting the stem for rotation within the housing. A rotor is mounted upon this stem and includes a round cylindrical pipe section 13 secured directly to the valve stem as by means of taper pins 14. The pipe section is slightly shorter in length than the distance between the end sections 5 and 7 so that when it is aligned with the inlet and outlet there is an unobstructed path through the valve, the small gap between the ends of the pipe section and the inlet and outlet making no difference in the flow characteristics. In order to turn the rotor, a valve operator 15 is mounted upon the valve stem and may be provided with a hand wheel 16 for manual operation. Power devices can be substituted for the hand wheel.

Each end section on the housing provides one valve seat respectively about an inlet or outlet. In the present invention, the seat itself is formed of resilient material. Referring particularly to Figure 2, a trapezoidal shaped rubber ring 20 is shown as mounted within the ring section 7 so that it has an inner surface 21 facing the center 22 of the rotor. While this surface is shown as generally straight from side to side, it may assume a spherical shape when in contact with the closure disc. In order to hold the ring 20 in place, a complementary groove 23 is machined into the ring section 7 to receive the rubber ring. On the inner side, a keeper plate 24 may supply the opposite side 25 of the groove to hold the ring in place, the keeper being held by screws 26 to the ring. While the ring shown is trapezoidal in shape, other shapes may be used, such as a square shape for low pressure valves or various special shapes.

The closure discs 27 and 28 are carried upon the sides of the cylindrical pipe section 13. A mounting block 29 and 30, respectively, is welded to the side of the pipe section and its outer surface is carefully ground to flatness for mounting its disc. Shim stock, commercially available in graduations of .0005 inch, is used to accurately position the resilient disc relative to its mounting block.

Each disc is so mounted that its outer surface will just lightly touch the inner seat surface of the resilient ring as the disc is swept into closing relation with the ring. With such light contact, the valve will be positively closed even under low pressure conditions. Each disc is supported at its center by a single bolt 31 or more than one bolt closely grouped around the center of the disc. The disc material is made thick enough to withstand the pressures, yet selected so that it will permit flexure of the peripheral portion more tightly against the seat material. On the upstream side, such flexure may move the disc out of contact with the rubber seat, allowing some leakage into the valve housing. As pressure builds up within the housing, the downstream disc will be flexed more tightly against its seat, thus sealing the valve more tightly.

It has been found that the rubber valve seat is not damaged if the disc is loaded and compresses the valve seat prior to moving off of the seat. As soon as a loaded and flexed disc moves off of a seat, it returns to its unstressed condition. This means that the disc is always brought into contact with the seat, with the initial very light contact which will not damage either the disc or the seat.

As a result of the present structure, a very small valve operator is needed to open and close the valve. The resilient seats and flexible discs insure closure even though temperature changes may cause some distortion. The valves are suitable for service in pressure ranges from slight vacuum up to 250 pounds per square inch liquid water service and some pressures even higher.

The foregoing detailed description is given for clearness of understanding only and no unnecessary limitations should be understood therefrom as modification will be obvious to those skilled in the art.

I claim:

1. A rotary valve, comprising: a hollow housing having spaced inlet and outlet openings; a ring of resilient material secured to the housing about each opening, each ring having an inner surface forming a valve seat; and a rotor within the housing carrying a flexible, spaced closure disc for contacting and extending across each said valve seat to close the valve and for sweeping movement generally through 90° away from the seats to open the valve, said discs being positioned on the rotor to contact lightly the resilient rings when moving toward valve closing position, said discs being located on the rotor to move simultaneously across the respective valve seats to generally close the interior of the housing from communication with the inlet and outlet, said upstream disc being flexed away from its seat by fluid under pressure to admit fluid to the housing after the valve is closed, and said downstream disc being flexible under influence of fluid admitted past the flexed upstream disc to flex into fluid tight engagement with its valve seat.

2. A rotary valve, comprising: a housing having opposite openings forming an inlet and an outlet; a ring of resilient material secured to the housing about each opening and having an inwardly facing surface forming a seat; and a rotatable rotor in the housing having a pair of spaced discs for simultaneous sweeping movement to positions respectively across the seats, each disc being positioned on the rotor for only light contact with its seat during closing movement and being resiliently flexible under influence of fluid pressure for moving peripherally relative to its respective resilient ring seat to admit fluid to the housing on the upstream side thereof and to close the valve on the downstream side of the housing.

3. A rotary valve, comprising: a hollow housing having spaced opposite openings forming an inlet and an outlet; a ring of resilient material secured to the housing about each opening and having a surface facing the center of the housing forming a valve seat; and a rotatable rotor in the housing having an individual disc member for cooperating with each seat to close the valve, said disc members being secured at their central portion to the rotor and having a peripheral portion capable of slight flexure under influence of fluid pressure thereon, said discs being positioned to contact lightly the resilient seat ring upon being swept across the seat toward closed position and being adapted to be pressed tightly against the seat by said fluid pressure flexure, said disc members being positioned for simultaneous swinging motion across the respective seats to close the interior of the valve housing at both seats without fluid tightness at either seat, said upstream disc member being flexed by fluid pressure away from its seat admitting said fluid past the seat into the housing to flex the downstream disc member toward its seat into fluid tight relation therewith.

References Cited in the file of this patent

UNITED STATES PATENTS

| | | |
|---|---|---|
| 147,532 | Horn | Feb. 17, 1874 |
| 1,824,511 | Spieser | Sept. 22, 1931 |
| 2,039,075 | Foell | Apr. 28, 1936 |
| 2,586,927 | Fantz | Feb. 26, 1952 |
| 2,741,138 | Russell | Apr. 10, 1956 |
| 2,809,011 | Davis | Oct. 8, 1957 |

FOREIGN PATENTS

| | | |
|---|---|---|
| 634,185 | France | Nov. 8, 1927 |
| 651,114 | Great Britain | Mar. 14, 1951 |
| 1,008,139 | France | Feb. 13, 1952 |
| 1,109,643 | France | Sept. 28, 1955 |